Feb. 15, 1938.      T. B. PRICKETT      2,108,076
APPARATUS FOR TREATING FLUIDS
Filed Dec. 3, 1935      2 Sheets-Sheet 1

WITNESS:
Robt R Kitchel

INVENTOR
Thomas B. Prickett
BY
Ira L. Nickerson
ATTORNEY.

Feb. 15, 1938.  T. B. PRICKETT  2,108,076
APPARATUS FOR TREATING FLUIDS
Filed Dec. 3, 1935  2 Sheets-Sheet 2
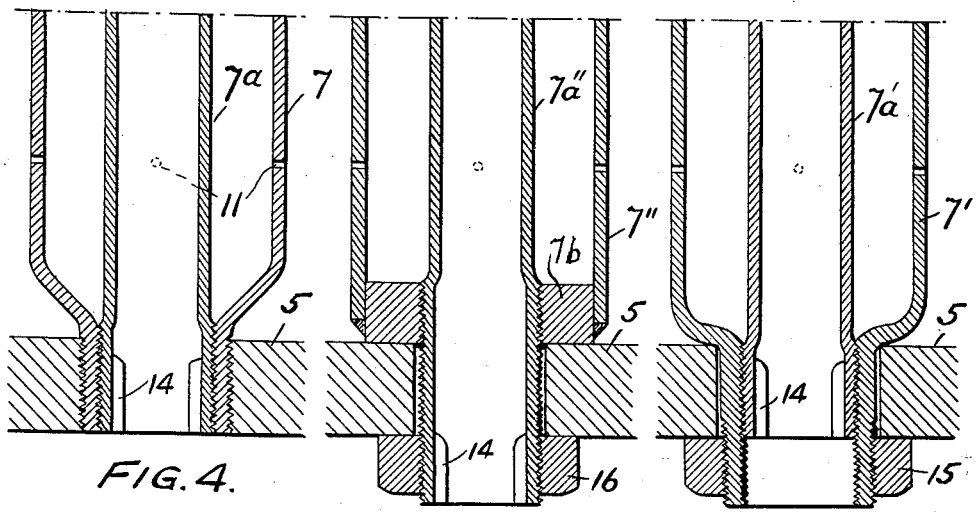
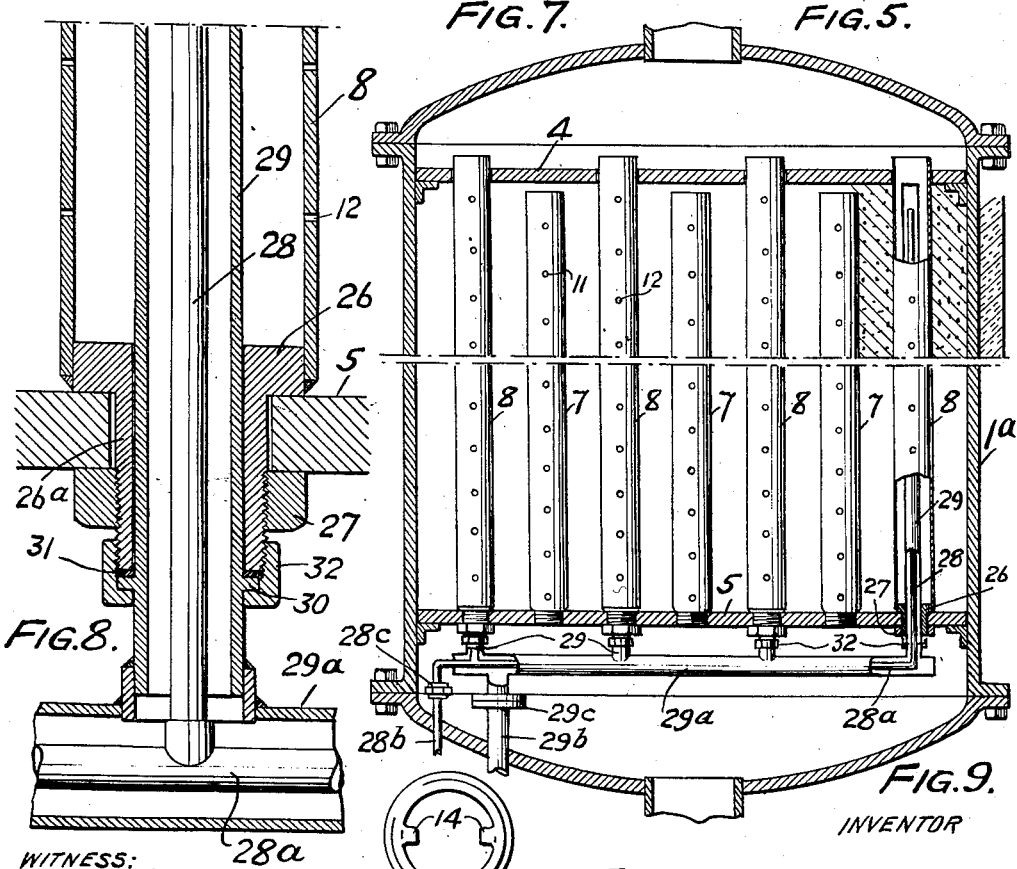
INVENTOR
Thomas B. Prickett
BY Ira L. Nickerson
ATTORNEY.

Patented Feb. 15, 1938

2,108,076

UNITED STATES PATENT OFFICE 2,108,076

APPARATUS FOR TREATING FLUIDS

Thomas B. Prickett, Woodbury, N. J., assignor to Houdry Process Corporation, Dover, Del., a corporation of Delaware Application December 3, 1935, Serial No. 52,692

12 Claims. (Cl. 23—288)

The present invention relates to the art of treating materials, particularly fluids, whether of a vaporous or gaseous or other nature, and concerns apparatus therefor, as well as details of assembly of the same. While relating to treating apparatus broadly, and especially to contact treating apparatus, in certain respects and for certain purposes it may be considered as related to or as a further devolopment of and improvement over the copending application of C. H. Thayer, filed November 9, 1935, Serial No. 48,974. The drawing in the Thayer application illustrates a treating apparatus or converter having a plurality of inlet and withdrawal conduits disposed in substantial parallelism within the reaction chamber thereof. A contact mass within the reaction chamber, surrounding such conduits, is also shown. The conduits serve, for example, to introduce reactants or fluids to be treated into the reaction chamber and to withdraw products therefrom.

Objects of this invention include providing a structure which is highly durable, can readily be assembled in a practical manner yet so that various parts thereof can be disassembled or made accessible to tools or treatment as desired, and is cheap but also convenient. Various objects specific to the type of treating apparatus shown in the above-mentioned copending application and to that illustrated in the drawings appended hereto include provision for removal of the inner conduit from the outer conduit of a nested assembly when the same is mounted within the reaction chamber, a method and means of providing access to most if not all of the conduits through one tube sheet, e. g. the lower tube sheet, and an improved system of mounting each group of conduits on a tube sheet.

These and other objects and advantages of the invention, as well as a quick understanding thereof, can readily be had by reference to the illustrative embodiment thereof, shown in the accompanying drawings, in which:

Fig. 4 is a broken away, detail view in section of a portion of the lower tube sheet with a nested conduit, which communicates with the lower manifolding chamber, mounted thereon;

Fig. 5 is a modification of the type of mounting shown in Fig. 4;

Fig. 6 is a plan view, looking up, of the lower end of the nested conduit shown in Fig. 4;

Fig. 7 is a further modification of the nested conduit structure and type of mounting shown in Fig. 5;

Fig. 8 is a modification of the mounting of an outlet conduit, such as shown in Figs. 2 and 3, with a nested heat exchange tube extending into the conduit through the mounting structure; and Fig. 9 shows a converter having outlet conduit mountings and connections of the type shown in Fig. 8.

Figure 1:
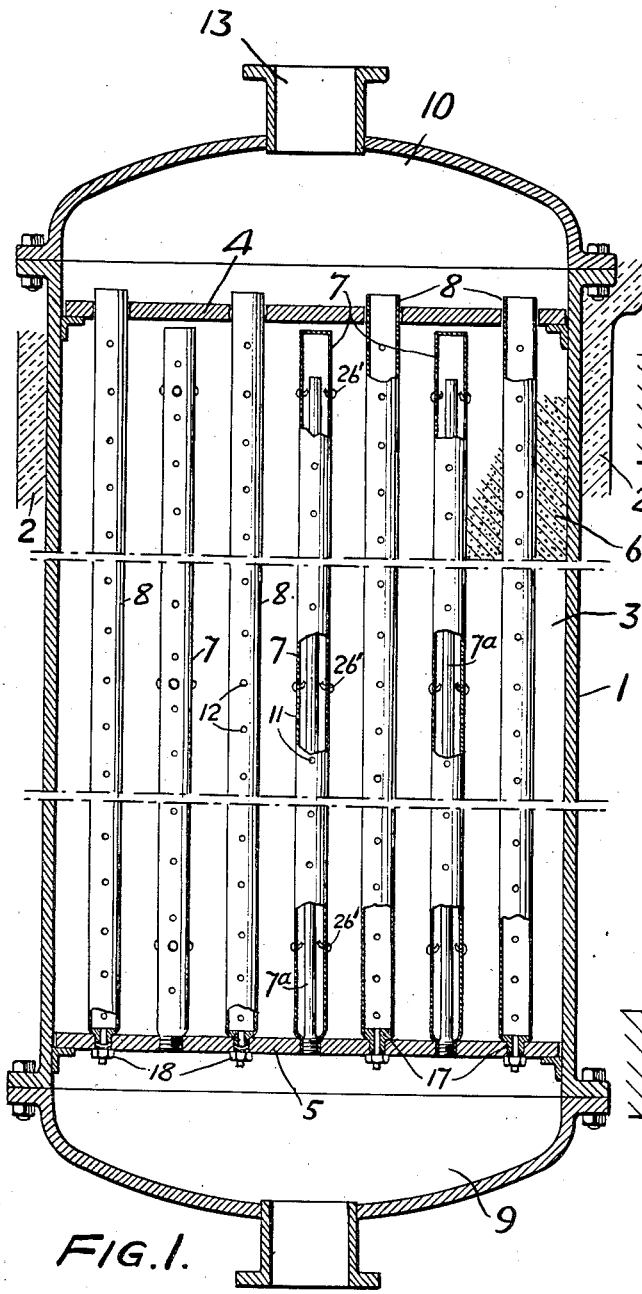
Fig. 1 is an elevational view in section of a treating apparatus or a converter structure.

Referring more in detail to the drawings, in the several figures of which like reference characters denote similar parts, 1 is a converter which is normally covered by insulation 2 and has a reaction chamber 3 bounded by upper partition member or tube sheet 4 and lower partition member or tube sheet 5. The reaction chamber may contain a contact mass 6 which is preferably in the form of bits, fragments or molded pieces for regeneration in situ. The mass surrounds the conduit 7 and 8, the former of which communicate with lower manifolding chamber 9 and, for purposes of illustration, may be considered as inlet conduits, while conduits 8 communicate with upper manifolding chamber 10 and may be considered as outlet conduits, and manifolding chamber 10 as an outlet manifold. In the normal, on-stream operation of the apparatus, a fluid to be treated, for example, a hydrocarbon fluid, such as gas oil, which it is desired to convert into lighter material such as motor fuel, may be introduced into the apparatus by means of manifolding chamber 9, thence through inner conduits 7a of the nested conduits 7 and finally through perforations or openings 11 therein, into contact with the mass 6. The fluid progresses through mass 6 to openings 12 in the outlet conduit 8, and, in the course of such passage, undergoes the desired treatment or reaction. Then it enters through openings 12 and passes from the reaction chamber through outlet conduits 8 into manifolding chamber 10, from which it may be educted by any suitable connections, such as through the opening 13 shown.

From time to time, the flow of reactant fluids is interrupted, the reaction chamber is purged of reactants and reaction products by steam, for example, or other inert fluid, and then a regeneration medium may be passed through the contact mass, either in the same direction or in the reverse direction, for example, to reactivate or regenerate the mass and to remove any accumulated deposits therefrom. If the deposits are to be burned away, the regeneration medium may consist of air or other oxygen-containing gas. This is the preferred method of regeneration, for example, when the fluids treated are hydrocarbons, such as petroleum oils which are being treated or converted into more desirable products.

In the course of operation of such structure, the perforations or openings 11 and/or 12 sometimes become stopped up and, when double or nested conduits are employed as indicated by reference character 7, it is occasionally desirable to remove the small inner conduits 7a in order to replace or clean the same. For these reasons, as well as others, it is desirable to have access to the interior of the conduits. I have provided ways in which this can be conveniently accomplished in connection with the inlet conduits, as illustratively shown in Figs. 4, 5, and 7. In Fig. 4, the outer conduit of the nested assembly is screwed into co-acting threads in the opening in the tube sheet 5 and the interior of the reduced or necked-down portion of the outer conduit is screw-threaded to cooperate with the male threads of the flared out portion of the inner conduit 7a. Flanges or projections 14 are provided on the inner circumference of such flared out portion of the conduit 7a so as to permit readily engaging the same with a simple tool or wrench for removal and replacement of the inner conduit 7a. The inner conduit may be withdrawn downwardly through the tube sheet 5.

In the embodiment shown in Fig. 5, the interior of the opening in the tube sheet 5 is not threaded but the nested assembly is held in firm engagement with the tube sheet by means of the hollow, threaded nut 15 which cooperates with the external threads on the lower end of the necked-down portion of the outer conduit 7' of the nested assembly. Male threads on inner conduit 7'a cooperate with threads on the inner circumference of the aforementioned necked-down portion in a manner similar to that described in connection with Fig. 4, and mounting and removal of the inner conduit is effected without disturbing the nut 15.

In the embodiment shown in Fig. 7, it will be seen that inner conduit 7"a is the support or means for holding the nested assembly rigidly to the tube sheet 5, the inner conduit having a much longer externally threaded portion at its lower end to cooperate not only with outer conduit 7" as by an internally threaded collar 7b thereon, but also to project through and beyond sheet 5 to be engaged by nut 16 therebelow.

Figure 2:
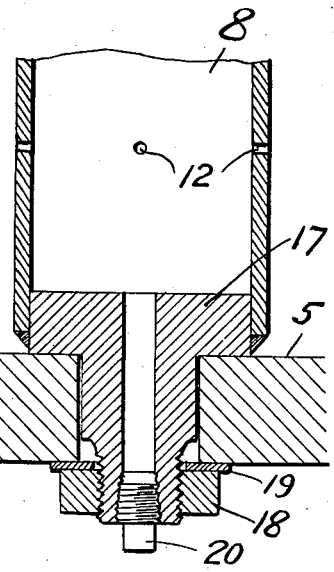
Fig. 2 is a broken away, detail view in section of a portion of the lower tube sheet having an outlet conduit mounted thereon which does not communicate with the adjacent, lower manifolding chamber in the normal operation of the apparatus.
Figure 3:
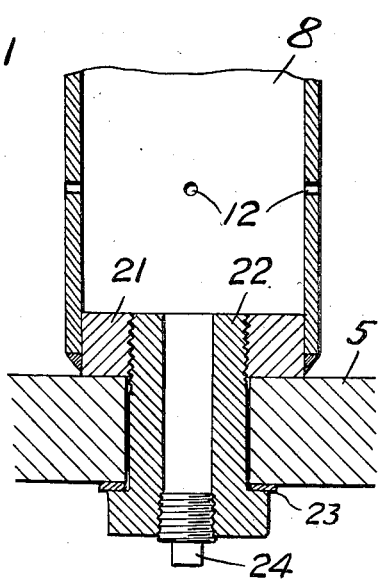
Fig. 3 is a modified form of the type of mounting shown in Fig. 2.

I have also provided ways in which access can be had to the interiors of conduits 8, which are mounted on sheet 5 but do not communicate therethrough. Illustrative means for this purpose are shown in Figs. 1, 2 and 3. These means also serve as convenient mountings for conduits 8. In Figs. 1 and 2, a somewhat T-shaped, hollow body 17 is shown welded to the conduit 8 and extending through an opening in tube sheet 5, the member 17 being externally threaded at its lower end to engage a nut 18 which holds the member 17 and conduit 8 in firm engagement with the tube sheet. Washer 19 (Fig. 2) is supplied between the nut and the lower portion of the tube sheet. The hollow portion of member 17 is threaded as shown to engage an oppositely threaded plug 20, thereby normally to keep the interior of conduit 8 out of communication with the lower manifolding chamber of the converter.

The mounting shown in Fig. 3 differs from that shown in Fig. 2 in that an annular internally threaded collar 21 is welded to the conduit 8 and a hollow stud 22 extends through the tube sheet 5 and screws into the internal threads of the collar. A washer 23 is located between the shoulder of the stud and the lower surface of the tube sheet adjacent the opening therein. The opening in the stud is threaded at its lower end to receive an oppositely threaded plug 24.

Figs. 8 and 9 show a further use for the means giving access to the interior of the outlet conduits mounted on tube sheet 5. In these figures, conduits 8 are provided with mounting fixtures 26 (comparable to member 17 in Fig. 2) which are welded or otherwise joined to the lower ends of conduits 8. The reduced portions 26a of tubular fixtures 26 extend through the openings therefor in tube sheet 5 and considerably therebelow and their threaded lower ends are engaged by nuts 27 to secure the fixtures in place. The bores through the fixtures slidably receive the outer imperforate members of nested conduit assemblies comprising inner conduits 28 and outer conduits 29. Each outer conduit has a radial flange 30 serving as a stop to limit the penetration of the assembly within conduits 8 and the bore of each fixture 26 is sealed in a fluid-tight manner by the provision of a packing or washer 31 interposed between flange 30 and the end of fixture 26 and by a clamping nut 32 engaging flange 30, on the one hand, and the external threads on 26a below nut 27. The nested assemblies 28, 29 are joined to a nested manifold made up of inner duct 28a and outer duct 29a and may be employed for the circulation of a temperature controlling fluid such as water, mercury, diphenyl, etc. within the conduits 8 and thereby within the reaction chamber of converter 1a. Mains 28b and 29b leading to ducts 28a and 29a of the manifold for the heat exchange medium have detachable joints at 28c and 29c. Hence, when it is desired to clean or inspect the interior of tubes 8 from below tube sheet 5, it is only necessary to disconnect the mains at joints 28c and 29c, remove the bottom cover of the converter, unscrew nuts 32, and withdraw manifold 28a, 29a and assemblies 28, 29 as a unit. In all the nested conduit arrangements, such as 7 and 7a in Fig. 1, suitable means may be provided for maintaining the conduits in spaced approximately concentric relation to each other as by bent rivets 26'.

It is to be noted that outlet conduits 8 are not firmly attached to upper tube sheet 4, through which they have fluid communication, but rather are free to move back and forth therethrough, as, for example, in case of relative expansions and contractions when the apparatus is in use and during assembly. Means permitting such movement while maintaining a substantially fluid-tight joint are disclosed and claimed in the aforesaid Thayer application.

In the course of operating apparatus of the type herein described, particularly when a contact mass is employed, fine dust or pulverized mass together with rust, scale, etc. is apt to accumulate within the conduits in the course of time. From time to time, this accumulation needs to be removed, and it is desirable to do so without entirely disassembling the converter and taking out the conduits. This may be accomplished, in the case of either group of conduits, by the structures applied, as above described.

Again, in the handling of certain fluids and under certain operating conditions, deposits of a gummy or resinous nature may be formed, together with or instead of carbonaceous material. In such a case, it is not uncommon for some of the perforations or openings in the conduits to become clogged or partly clogged. Therefore, it is desirable to have access to the interior of all of the conduits also for the purpose of eliminating this difficulty.

While the invention has special application to apparatus of the type illustrated and generally to the type which employs contact masses adapted for treating fluids, it will be understood that the structures disclosed have broad application to apparatus of various types where tubes or conduits are mounted within a chamber or upon a tube sheet. All such adaptations of the invention are contemplated within the scope of the appended claims.

What I claim is:

1. In apparatus for the contact treatment of fluids, a casing providing a reaction chamber adapted to contain a contact mass, a plurality of conduits extending within said chamber and joined to one wall thereof, one group of said conduits communicating through said wall with an adjacent zone and another group thereof communicating through an opposite wall with a zone adjacent to it, the conduits of one group being arranged in interspersed relation with those of the other group, structural means located in the wall of said chamber to which said conduits are joined and extending into the interiors of conduits of the group which communicates only through the said opposite wall to provide a passageway to the interiors of said conduits, and an element removably engaging each of said structural means to close its passageway when access to the last-mentioned conduits is not desired.

2. Treating apparatus comprising an upright casing providing a chamber, partition members bounding the top and bottom of said chamber, two groups of conduits extending in upright relation within said chamber, one group thereof communicating through the bottom partition and the other through the top partition, with zones exterior to said chamber, the conduits of one group being interposed between those of the other group, all of said conduits being mounted on one of said partitions, structural means located in said last-mentioned partition and extending into the interior of each of the said conduits which communicate through the opposite partition to provide a passageway into the interiors of each of the last-mentioned conduits, and an element removably engaging each of said structural means to close the passageway therein when access to said last-mentioned conduits is not desired.

3. In heat exchange apparatus, a casing providing a reaction chamber, two groups of conduits mounted on a wall of said chamber, one of said groups of conduits communicating through said wall with a zone adjacent thereto and a second group thereof communicating through the opposite wall, mounting elements adapted to removably engage the said wall on which the conduits are mounted and to engage the conduits of said second group and each having an internal passageway or opening to provide access to the interiors of conduits of said second group, and tubular means through which a temperature controlling fluid may be circulated extending through the said passageway or opening and within at least one of the conduits of said second group and being removably engaged with the respective said mounting element so as to close its said passageway or opening.

4. Treating apparatus comprising a casing providing a reaction chamber, a partition bounding either end of said reaction chamber, contact or catalytic material within said chamber, a conduit extending within said reaction chamber, embedded in said contact material, and being mounted to one partition and communicating through the other partition, and structural means located in the partition to which said conduit is mounted and extending into the interior of said conduit to provide a passageway thereinto, and an element removably engaging said structural means to close its passageway when access to said conduit is not desired.

5. Apparatus comprising a casing providing a reaction chamber, a partition member having an opening therein separating one end of said reaction chamber from a manifolding space adjacent thereto, contact or catalytic material within said reaction chamber, and a nested conduit assembly, providing inner and outer telescoped conduits, extending within said chamber and embedded in said material, the inner conduit being constructed to provide fluid communication between it and the surrounding space within said outer conduit, the outer conduit being removably joined to said partition member in position to register with said opening and the said inner conduit being removably united within said outer conduit, the place of union between said inner and outer conduits being adjacent the said opening in said partition member, said outer conduit having perforations or openings spaced from each other, around and throughout the length thereof, to provide for the passage of fluid between the last mentioned conduit and the said reaction chamber.

6. Apparatus comprising a casing providing a reaction chamber, a partition member having an opening therein separating one end of said reaction chamber from an adjacent manifolding space, catalytic or contact material within said reaction chamber, and a nested conduit assembly made up of inner and outer telescoped conduits extending within said chamber and embedded in said material, the inner conduit being constructed to provide fluid communication between it and the space surrounding it within said outer conduit, one end of the outer conduit extending through the said opening in the partition member and being externally threaded to receive a nut and internally threaded to removably receive co-acting external threads on the end of the said inner telescoped conduit, said outer conduit having perforations or openings spaced from each other, around and throughout the length thereof, to provide for the passage of fluid between the last mentioned conduit and the said reaction chamber.

7. Apparatus comprising a casing providing a reaction chamber, a partition member having an opening therein separating one end of said reaction chamber from an adjacent manifolding space, catalytic or contact material within said reaction chamber, and a nested conduit assembly made up of inner and outer telescoped conduits, extending within said chamber and embedded in said material, the inner conduit being constructed to provide fluid communication between it and the space surrounding it within said outer conduit, one end of said inner conduit extending beyond the corresponding end of the outer conduit and being externally threaded to be removably joined to said partition member in registered engagement with the said opening therein and being removably joined to said outer conduit adjacent the said corresponding end of the latter, said outer conduit having perforations or openings spaced from each other, around and throughout the length thereof to provide for the passage of fluid between the last mentioned conduit and the said reaction chamber.

8. Apparatus comprising a casing providing a reaction chamber and manifolding chambers adjacent either end of said reaction chamber, an opening into each of said manifolding chambers for the introduction or withdrawal of fluid, tube sheets separating said reaction chamber from said manifolding chambers, a plurality of perforated conduits extending within said reaction chamber in substantial parallelism, one group of said conduits, having inner and outer nested members, communicating through one of said tube sheets with the manifolding chamber adjacent to it and a second group of said conduits communicating through the other of said tube sheets with the other manifolding chamber, both groups of said conduits being removably joined only to said first-mentioned tube sheet, the said inner members of the group of nested conduits being removably joined to the outer members thereof adjacent the points at which the nested conduits are joined to the tube sheet, and means for providing access to the interiors of the conduits of said second group, which do not communicate through the tube sheet to which they are joined, said means comprising members, each having an internal passageway therethrough, which are removably attached to said tube sheet through respective openings therein in registry with said last-mentioned conduits and removable closure means sealing the said internal passageway of each of said members, and the opposite ends of said last-mentioned conduits extending through the opposite tube sheet in slidable relation therewith.

9. Heat exchange apparatus comprising a casing, partitions or tube sheets at the ends of said casing dividing the interior thereof into a central chamber and end manifolding chambers, a series of perforated conduits mounted on one tube sheet to span said central chamber and extend through the opposite tube sheet in slidable relation therewith, mounting means for said conduits giving access to the interior of the latter, each of said mounting means comprising a hollow member joined to one of said conduits through a respective opening in said one tube sheet, and nested conduit means extending through each of said mounting means for the circulation of a heat exchange medium within said conduit, and sealing means surrounding each of said nested conduit means and adapted to removably engage said mounting means so as to seal the interiors of the aforesaid conduits from fluid communication with the end manifolding chamber adjacent said mounting means.

10. Heat exchange apparatus comprising a casing, partitions or tube sheets at the ends of said casing dividing the interior thereof into a central chamber and end manifolding chambers, a series of conduits mounted on one tube sheet to span said central chamber and extend through the opposite tube sheet, hollow stud-like members for removably mounting said conduits on said one tube sheet, nested heat exchange conduit assemblies extending through said hollow members within said conduits, a common manifold for said assemblies forming with the latter a unit for insertion and removal, and detachable coupling means for effecting a fluid tight joint between each individual assembly and the hollow member through which it extends.

11. In apparatus for treating fluids, an upright casing providing a reaction chamber adapted to contain a contact mass, tube sheets bounding the top and bottom of said reaction chamber, a manifold exterior to said reaction chamber and adjacent the top thereof, a manifold exterior to said reaction chamber and adjacent the bottom thereof, two groups of conduits extending within said chamber, conduits of one group being arranged in interspersed relation with the conduits of the other group, the conduits of one group communicating with the manifold at one end of said reaction chamber and adapted to introduce fluid thereinto and the conduits of the other group communicating with the manifold at the other end of said reaction chamber and adapted to withdraw fluid therefrom, all of said conduits being mounted on the lower tube sheet but the conduits of only one group thereof communicating through openings therein with the manifold adjacent thereto, other openings in said lower tube sheet interspersed with the aforesaid, structural means each having a passageway extending therethrough adapted to extend through the said other openings and to removably engage said lower tube sheet and each of said means extending into the interior of one of the conduits of said group which do not communicate with said adjacent manifold, to provide access to the interiors of said conduits through the said passageways in said structural means, and an element removably engaging each of said structural means to close its passageway when access to the last-mentioned conduits is not desired.

12. In apparatus for treating fluids, a casing providing a reaction chamber bounded at one end by a partition member having an opening therethrough, contact or catalytic material within said chamber and substantially filling the same, a perforated conduit in registering relation with the opening in said partition member and extending across and within said reaction chamber and terminating adjacent the opposite end of said reaction chamber to be embedded in said contact material, there being an opening in said conduit adjacent said opposite end of said reaction chamber, a stud-like member extending through the aforementioned opening in said partition member and having means adjacent one end thereof for detachably engaging said conduit and at the other end thereof for engagement with the face of said partition member opposite from said reaction chamber, said stud-like member having an opening extending therethrough to give access to the interior of said conduit, and removable means sealing the said opening in said stud-like member.

THOMAS B. PRICKETT.